United States Patent
Chen et al.

(10) Patent No.: US 10,502,657 B2
(45) Date of Patent: Dec. 10, 2019

(54) METHOD AND APPARATUS FOR DETERMINING COOLING GALLERY FILL IN A PISTON

(71) Applicant: Mahle International GmbH, Stuttgart (DE)

(72) Inventors: Yu Chen, Novi, MI (US); Michael T. Lapp, Farmington Hills, MI (US)

(73) Assignee: Mahle International GmbH (DE)

(*) Notice: Subject to any disclaimer, the term of this patent is extended or adjusted under 35 U.S.C. 154(b) by 103 days.

(21) Appl. No.: 15/487,100

(22) Filed: Apr. 13, 2017

(65) Prior Publication Data

US 2018/0299349 A1 Oct. 18, 2018

(51) Int. Cl.
| | |
|---|---|
| *G01M 15/08* | (2006.01) |
| *F01M 1/08* | (2006.01) |
| *F02F 3/22* | (2006.01) |
| *G01F 22/02* | (2006.01) |

(Continued)

(52) U.S. Cl.
CPC ............ *G01M 15/08* (2013.01); *F01M 1/08* (2013.01); *F01M 11/02* (2013.01); *F01P 3/10* (2013.01); *F01P 2025/04* (2013.01); *F01P 2025/64* (2013.01); *F01P 2025/66* (2013.01);
(Continued)

(58) Field of Classification Search
CPC ...... G01M 15/08; G01M 15/02; G01M 15/09; F01P 3/08; F01P 3/10
See application file for complete search history.

(56) References Cited

U.S. PATENT DOCUMENTS

| | | | |
|---|---|---|---|
| 5,335,632 A | * | 8/1994 | Hefley ............... F02B 75/045 123/48 B |
| 8,265,853 B2 | | 9/2012 | Buslepp et al. |
| 8,800,526 B2 | | 8/2014 | Richerson |

(Continued)

FOREIGN PATENT DOCUMENTS

| | | |
|---|---|---|
| KR | 10-1068450 B1 | 9/2011 |
| SU | 890100 A1 | 12/1981 |

OTHER PUBLICATIONS

Piston Cooling Nozzle Oil Jet Evaluation Using CFD and a High Speed Camera; Kelleher e al./SAE Int. J. Commer: Veh./vol. 9, Issue 2 (Oct. 2016).

(Continued)

*Primary Examiner* — Matthew G Marini
(74) *Attorney, Agent, or Firm* — Fishman Stewart PLLC

(57) ABSTRACT

A system includes an engine block having a plurality of cylinder-piston combinations. At least one of the cylinder-piston combinations includes a cylinder, a piston positioned in the cylinder and coupled to a connecting rod, the piston having an internal cooling gallery about a circumference of the piston, an oil jet for introducing coolant into the cooling gallery, and at least one pressure sensor positioned within the piston to detect pressure fluctuations within the cooling gallery. The system includes a processor having a program coupled thereto. The processor is configured to detect cyclical pressure fluctuations within the cooling gallery, via the at least one pressure sensor, during a linear motion of the piston within the engine block, determine pressures that occur during the detected cyclical pressure fluctuations, and determine a fill ratio of coolant within the cooling gallery based on the determined pressures.

14 Claims, 8 Drawing Sheets

(51) Int. Cl.
*F01P 3/10* (2006.01)
*F01M 11/02* (2006.01)

(52) U.S. Cl.
CPC ............ *F02F 3/22* (2013.01); *F02F 2200/00* (2013.01); *G01F 22/02* (2013.01)

(56) References Cited

U.S. PATENT DOCUMENTS

| | | | |
|---|---|---|---|
| 9,068,497 B2 | 6/2015 | Anderson et al. | |
| 2006/0150935 A1* | 7/2006 | Donaldson | F01L 9/02 |
| | | | 123/90.12 |
| 2014/0172277 A1 | 6/2014 | Klett | |
| 2014/0180605 A1* | 6/2014 | Richerson | G01M 15/06 |
| | | | 702/33 |
| 2015/0377115 A1* | 12/2015 | Shinagawa | F02P 5/152 |
| | | | 123/41.15 |

OTHER PUBLICATIONS

Prediction of Temperatures on Pistons with Cooling Gallery in Diesel Engines Using CFD Tool; Hidehiko Kajiwara, Yukihiro Fujioka and Hideo Negishi; SAE Technical Paper Series 2003-01-0986.

CFD Modeling of the Multiphase Flow and Heat Transfer for Piston Gallery Cooling System; Yong Yi and Madhusudhana Reddy; SAE Technical Paper Series; 2007-01-4128; 2007.

3-D Modeling of Heat Transfer in Diesel Engine Piston Cooling Galleries; Jinfeng Pab, Roberto Nigro; and Eduardo Matsuo; SAE Technical Paper Series; 2005-01-1664; 2005.

English Abstract of Korean reference 10-1068450 KR, B1, Sep. 28, 2011, Dong Yang Piston Co., Ltd.

* cited by examiner

METHOD AND APPARATUS FOR DETERMINING COOLING GALLERY FILL IN A PISTON

BACKGROUND

A power cylinder assembly of an internal combustion engine generally includes a reciprocating piston disposed within a cylindrical cavity of an engine block. One end of the cylindrical cavity may be closed while another end of the cylindrical cavity is open. The closed end of the cylindrical cavity and an upper portion or crown of the piston defines a combustion chamber. The open end of the cylindrical cavity permits oscillatory movement of a connecting rod, corresponding with a speed of the engine, which joins a lower portion of the piston to a crankshaft, which is submersed in an oil sump. The crankshaft converts linear motion of the piston (resulting from combustion of fuel in the combustion chamber) into rotational motion.

Internal combustion engines, and in particular the pistons of such engines, are under increased stress as a result of efforts to increase overall efficiency, e.g., by reducing piston weight and/or increasing pressures and temperatures associated with engine operation. Thus, to improve engine performance, increase engine efficiency, and reduce fuel consumption, engine designs have been reduced in size in recent years. As engine size has reduced, combustion temperatures have correspondingly and generally increased. Piston cooling is therefore increasingly important for withstanding the increased stress of such operational conditions over the life of the engine.

Known piston designs include a combustion bowl facing the combustion chamber, the combustion bowl typically having a curved shape that optimizes power output of the piston during the combustion process. That is, typically the shape of the combustion bowl is selected such that the flame front grows optimally into the curved combustion bowl during each combustion event to maximize power output.

Known piston designs also typically include cooling galleries disposed approximately about a circumference of the combustion bowl, allowing for coolant fluid to pass through and remove heat during piston operation. Crankcase oil is introduced as cooling medium into a cooling gallery, and the oil removes combustion energy that passes via conduction into the piston. However, controlling the overall temperature with crankcase oil is challenging for a variety of reasons. First, knowing the actual flow rate into the cooling gallery presents its own challenges because flow distributes within an engine to each of the pistons. The flow rate out of the oil injector may be reasonably determined, but the capturing and flow within each piston may thereby not be known, though an overall flow rate to all of the pistons may be known.

Moreover, flow characteristics within each cooling gallery of all the pistons itself may not be known. The cyclical, oscillatory, or sinusoidal motion of the piston causes abrupt directional changes in the direction of travel. Such rapid directional changes result in corresponding cyclical filling and emptying steps during the overall motion of the piston. When the piston reaches top dead center (TDC), the oil in the cooling gallery travels to the top of the gallery, and when the piston reaches bottom dead center (BDC), the oil flushes to the bottom of the gallery. A piston cooling nozzle injects or otherwise introduces oil into the cooling gallery during this very rapid cyclical operation. Such operation thereby and correspondingly results in a rapid and very dynamic flushing and filling operation of coolant or oil within the cooling chamber of the piston. A volume of oil within the cooling gallery thereby is constantly changing during the dynamic, cyclical motion. The amount of oil within the cooling gallery affects the rate of heat transfer within the cooling gallery, as well, and the heat transfer coefficient in particular within the cooling chamber is very difficult to determine.

As such, manufacturers have developed different methods to determine or at least estimate the amount of heat transfer that occurs within the cooling chamber. One known method involves the use of very complex computational fluid dynamics (CFD) computer models. The computer models attempt to model and determine the overall system performance to include flow rates of the oil and the resulting heat transfer coefficients. However, CFD modeling is highly dependent on such factors as oil flow rates to each of the pistons, engine speed (as reflected in reciprocation speed of each individual piston), oil hole diameter, shape of the cooling gallery, and other physical aspects of the system. Additional factors include temperature effects, and material properties of the oil may not even be known or understood to the degree necessary to validate a CFD model. For instance, oil viscosity may not particularly be known because the temperature itself may not be known, although there are known techniques for estimating or otherwise determining the oil viscosity experimentally.

One known factor for assessing cooling in a cooling gallery of a piston is to use CFD models to estimate the amount of oil that is in the cooling gallery throughout the cyclical action of the piston. A 'fill ratio' is estimated in the cooling gallery, based on parameters that are input to the CDF model. The fill ratio changes throughout the cyclical action, thus in one known CFD model an average fill ratio is used, which is determined at steady-state conditions after accounting for initial transient effects.

The fill ratio may thereby be used to estimate the heat transfer coefficient that occurs within the cooling chamber. However, given the uncertainties of the CFD modeling, the instantaneous fill ratio itself may not be known, and the average fill ratio may not be accurately determined. That is, for any given flow rate into and out of the cooling chamber, the amount that actually remains within the cooling chamber during various portions of the cyclical action may not be known. The resulting heat transfer coefficient, likewise, may therefore be equally, if not more, uncertain.

Thus, many factors may converge that can cause difficulty in actually validating a CFD model of oil in a cooling gallery, and for determining how much oil is in the cooling chamber during the cyclical operation of the piston. There are therefore many factors that lead to uncertainty of determination of the heat transfer coefficient in the cooling chamber, the rate of heat transfer within the piston, and ultimately what the operating temperature of the piston is. As such, a CFD model does not necessarily provide the requisite information to estimate or otherwise understand the factors that determine the rate of heat transfer in a piston during operation.

Accordingly, there is a need for an improved method and apparatus for determining a cooling gallery fill in a piston.

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of pistons and methods of making the same. An exemplary piston assembly may include a piston crown and skirt. The crown may include radially inner and outer crown mating surfaces, and the crown may define at least in part a cooling gallery extending about a periphery of the crown. The crown may further include a crown collar wall extending downward toward a free end of the crown collar wall. The skirt may include a pair of oppositely disposed pin bosses that each define piston pin bores configured to receive a piston pin for securing a connecting rod between the pin bosses. The skirt may further include a radially inner skirt mating surface abutted along a radially inner interface region with the radially inner crown mating surface, and a radially outer skirt mating surface abutted along a radially outer interface region with the radially outer crown mating surface such that the cooling gallery is substantially enclosed. The skirt may further include an inner collar wall disposed radially inwardly of the radially inner interface region and extending upwards to the free end of the crown collar wall.

Figure 1:
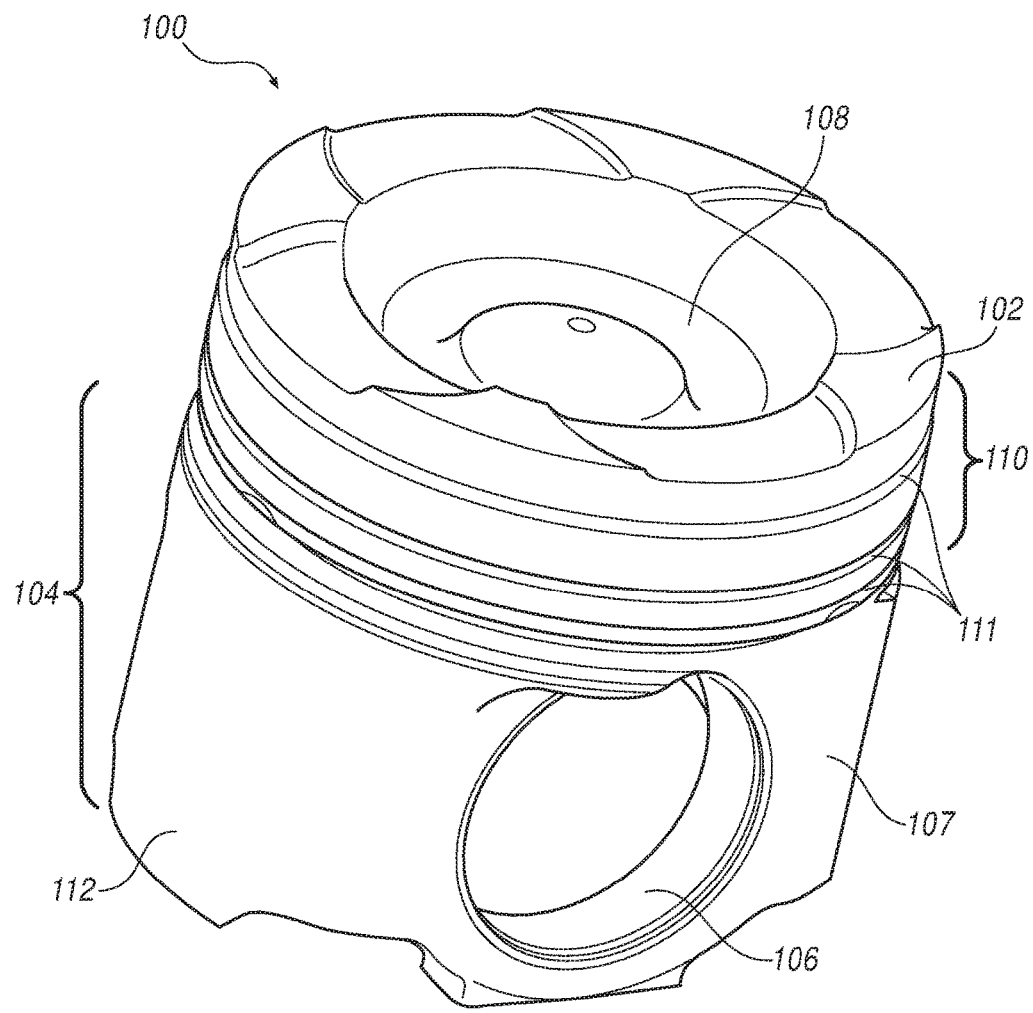
FIG. 1 is a perspective view of an exemplary piston assembly.

Turning now to FIG. 1, an exemplary piston assembly 100 is illustrated. Piston assembly 100 may include a piston crown 102 and a piston skirt 104. The piston crown 102 may include a combustion bowl 108 and a ring belt portion 110 that is configured to seal against an engine cylinder or bore (not shown) receiving the piston assembly 100. For example, the ring belt portion 110 may define one or more circumferential grooves 111 that receive piston rings (not shown), which in turn seal against engine bore surfaces during reciprocal motion of the piston assembly 100 within the engine bore.

The piston skirt 104 generally supports the crown 102 during engine operation, e.g., by interfacing with surfaces of an engine bore (not shown) to stabilize the piston assembly 100 during reciprocal motion within the bore. For example, the skirt 104 may have an outer surface 112 that generally defines a circular outer shape about at least a portion of a perimeter of the piston assembly 100. The outer shape may correspond to the engine bore surfaces, which may be generally cylindrical. The outer surface 112 of the skirt 104 may generally slide along the bore surfaces as the piston moves reciprocally within the bore.

The skirt 104 may also include piston pin bosses 107. The piston pin bosses 107 may generally be formed with apertures 106 configured to receive a piston pin (not shown). For example, a piston pin may be inserted through the apertures in the piston pin bosses 107, thereby generally securing the skirt 104 to a connecting rod (not shown). The pin bosses 107 generally define an open area between the pin bosses 107, e.g., for receiving the connecting rod (not shown).

Figure 2:
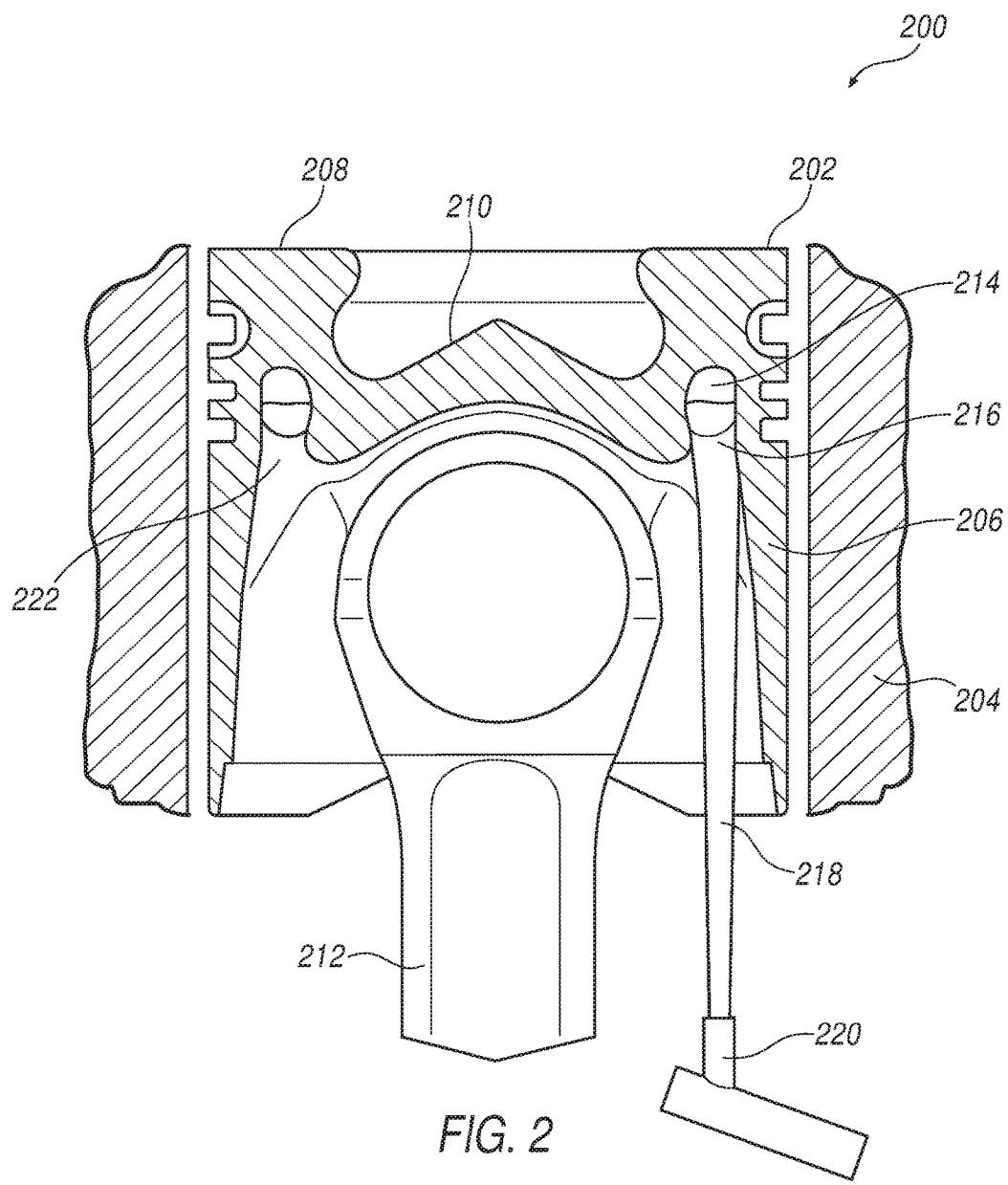
FIG. 2 illustrates a system that includes a piston for an internal combustion engine.

Turning now to FIG. 2, a system 200 includes a piston 202 for an internal combustion engine positioned in a cylinder 204 of an engine block. Piston 202 includes a piston body 206 having a top surface 208 and having formed therein a combustion bowl surface 210. Piston 202 is coupled to a connecting rod 212 and includes an internal cooling gallery 214 that is disposed about a circumference of piston 202. Rings, although not shown, are positioned in grooves, corresponding to grooves 111 as shown in FIG. 1. A first aperture or opening 216 is disposed in piston 202 such that crankcase oil can be introduced thereto, and into cooling gallery 214, via an oil jet or cooling nozzle 220 during operation of the internal combustion engine. A second aperture or opening 222 is disposed in piston 202 such that the crankcase oil exits after flowing through cooling gallery 214 about the circumference of piston 202. Typically, first aperture 216 and second aperture 222 are positioned 180° opposite one another such that flow of oil passing into first aperture 216 splits and passes along cooling gallery 214 in two parallel flows, and then rejoins at second aperture 222 where the flow exits cooling gallery 214.

According to the disclosure, a fill ratio of the oil within cooling gallery 214 may be determined during operation of the internal combustion engine. That is, during a cyclical operation of piston 202 within cylinder 204, and despite the very dynamic and oscillatory action of piston 202, the fill ratio is determined based on a pressure measurement during operation of the internal combustion engine, as will be further described.

Figure 3:
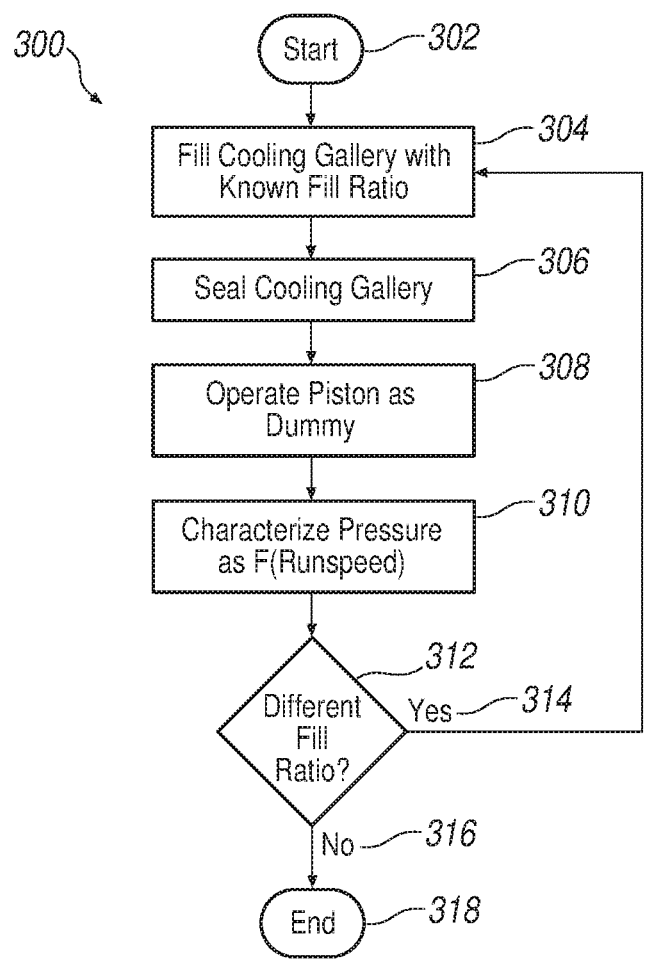
FIG. 3 illustrates a calibration sequence for generating calibration data to correlate a fill ratio with measured pressure within a cooling gallery.
Figure 4:
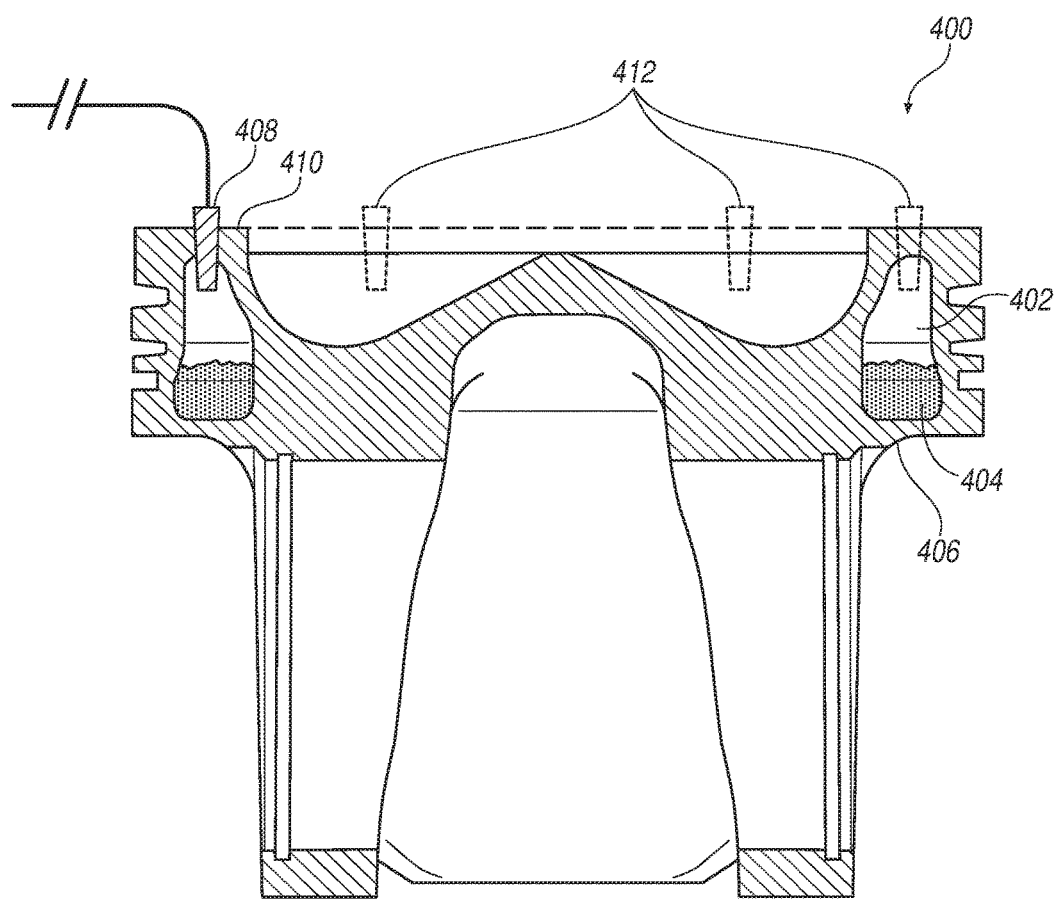
FIG. 4 illustrates a piston used for generating the calibration data.
Figure 5A:
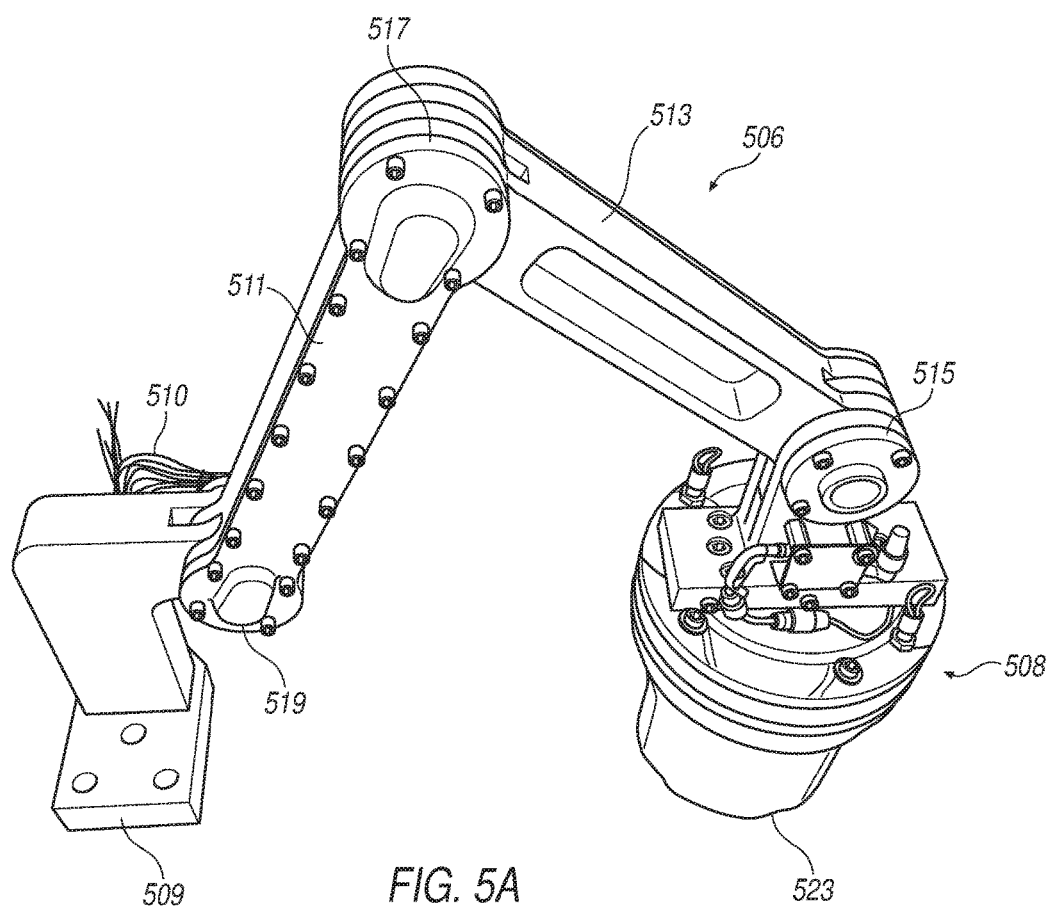
FIG. 5A illustrates a test arm for obtaining measured pressure data from the piston of FIG. 4.
Figure 5B:
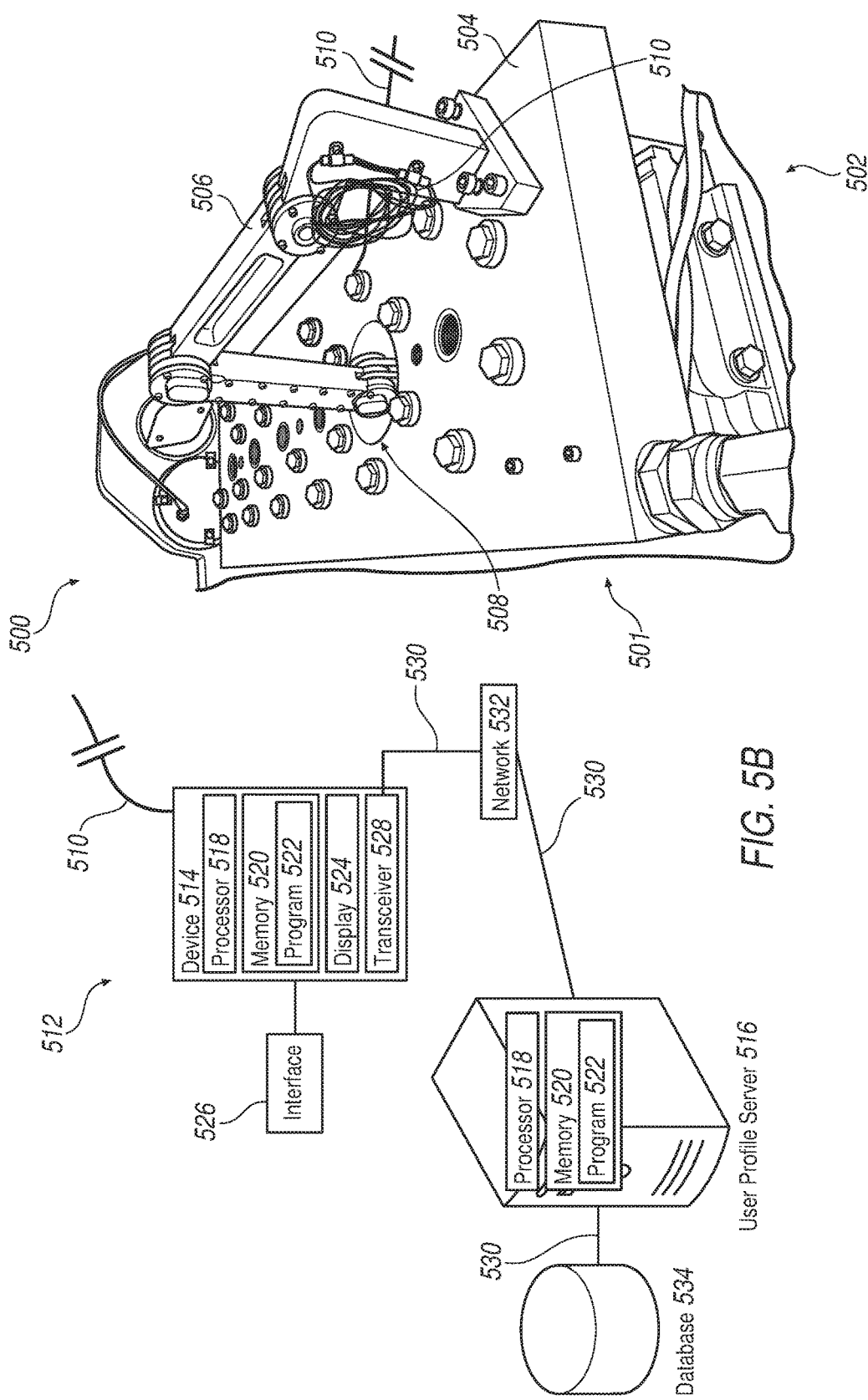
FIG. 5B illustrates a system for using the test arm of FIG. 5A.

FIG. 3 illustrates a calibration sequence 300 for generating calibration data to correlate a fill ratio with measured pressure within a cooling gallery, according to the disclosure. FIG. 4 illustrates an exemplary piston used for generating the calibration data, and FIG. 5A illustrates a test arm for obtaining measured pressure data from the piston of FIG. 4, and FIG. 5B illustrates further details of a system 500 using the test arm of FIG. 5A.

Referring first to FIG. 3, calibration sequence 300 starts at step 302. Piston 400 of FIG. 4 illustrates an exemplary piston, having similar features to that in system 200 in FIG. 2, and includes a cooling gallery 402 having a fluid 404 therein. Typically, the fluid 404 would be an oil, but may be various coolants. Piston 400 is a cross-sectional view that shows cooling gallery 402 fully enclosed and including a wall 406. It is contemplated, however, that piston 400 includes an inlet and outlet (not shown in FIG. 4), comparable to openings 216 and 222 of FIG. 2, but that they are sealed once fluid 404 is introduced into cooling gallery 402, for calibration purposes. A pressure sensor 408 is positioned to pass through a top surface 410 of piston 400, and penetrate into cooling gallery 402 such that a pressure is measured therein. According to the disclosure, one pressure sensor 408 or numerous additional pressure sensors 412 may be disposed about a circumference of piston 400. In one example, six sensors 412 are disposed uniformly about the circumference. It is contemplated, however, that any number of sensors 412 may be used, which enable further measurements about the circumference of piston 400.

According to the disclosure, piston 400, with its known fill of fluid 404 (due to the cooling gallery 402 being sealed), may be placed within an engine 502 of system 500. Cooling gallery 402 itself includes a total volume, and thus a fill ratio of fluid may be determined generally as a fraction or ratio of a known volume of fluid 404 to the total volume of cooling gallery 402.

System 500 includes an engine 501 having a plate 504 attached to engine block 502 in a laboratory or manufacturing setting, allowing full functionality of engine block 502 and operation of all cylinders, for test and/or calibration purposes. According to the disclosure, system 500 includes a test arm 506 that allows for mechanical manipulation of an end effector 508, which also contains and allows access to piston 400 therein. More specifically, end effector 508 secures to the top surface 410 of piston 400, and includes wires 510 that pass through or along the illustrated shafts of test arm 506 and to the one or more pressure sensors 408, 412 of piston 400. Wires 510 pass from end effector 508 to a computing system 512.

Test arm 506 includes an attachment base 509, a first extension 511, and a second extension 513. Test arm also includes three rotating joints or hinges 515, 517, 519 that allow for rotational motion between the relative components. End effector 508 also includes a piston assembly 523 having piston 400 attached thereto.

System 512 may be used to generate and communicate pressure data as measured by pressure sensors 408, 412. System 512 may include a device 514, server 516, processor 518, memory 520, program 522, display, user interface 526, transceiver 528, connection 530, network 532, and database 534. System 512 may take many different forms and include multiple and/or alternate hardware components and facilities. While an exemplary system 512 is shown in FIG. 5, the exemplary components illustrated in FIG. 5 are not intended to be limiting. Indeed, additional or alternative components and/or implementations may be used.

Accordingly, engine 501 may be operated, having all piston/cylinder combinations operational, except for piston 400 that is mechanically coupled to end effector 508 as a piston assembly 523. In one form, operation of engine 501 may be mimicked, in which case there is no combustion in any of the cylinders, but instead an external input (not shown) is used to cause rotation of components. Piston 400 is mechanically coupled to engine 501 via a connecting rod, such as connecting rod 212 shown in FIG. 2. According to one example, it is contemplated that the operation of engine 501 is controlled via system 512. However, it is also contemplated that engine 502 may be controlled by a separate engine control system, not shown, as is known in the art.

As such, operation of engine 501 causes an oscillatory or reciprocating cyclical operation of piston 400 within its cylinder, and sensor(s) 408, 412 are thereby able to measure pressures that occur within cooling gallery 402. During operation of engine 501 results in piston 400 moving rapidly and linearly up and down and within a cylinder of engine block 502. Hinges 516, 518, 520 thereby allow the very rapid linear motion of piston 400 to occur, holding fast wires 510 within first and second extensions 512, 514.

Further, although piston assembly 523 is shown as having wires 510 passing out of its top (so that wires 510 carry signals of sensors 408, 412), it is contemplated that wires may pass through a bottom of piston assembly 523. Such an arrangement would include wires passing out from a bottom of piston 400 in proximity to connecting rod 212 as shown in FIG. 2, and would also include wires passing otherwise through engine block 501 to system 512, which should be properly placed to avoid interference of oil flow. Further, it is contemplated that sensors 408, 412 may have a wireless transmission capability, and thus may be used to transmit pressure fluctuation data a computer system, such as system 512.

Figure 6:
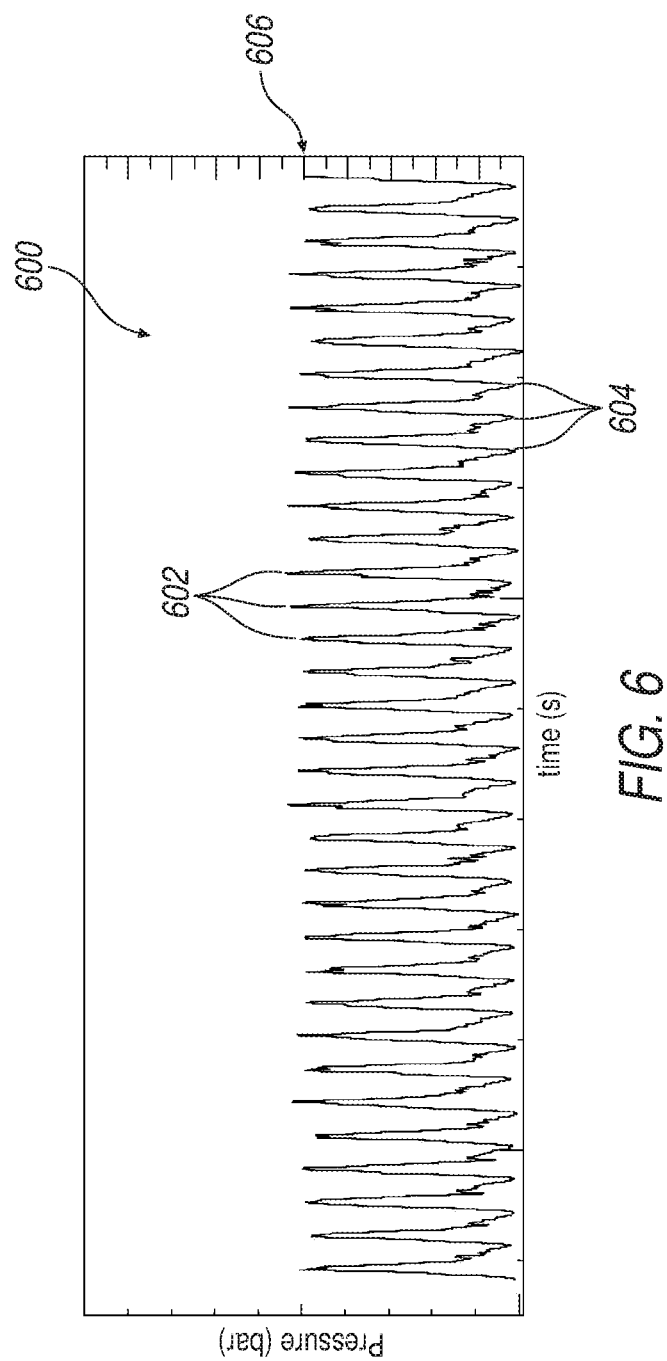
FIG. 6 is exemplary graph of an oscillating pressure measured in a cooling gallery.

An exemplary graph 600 of the oscillating pressure is shown in FIG. 6. Graph 600 includes pressure peaks 602 and valleys 604 that occur at a piston oscillatory rate that corresponds with a run speed of the engine. As one example the run speed may vary from 600 to 1800 revolutions per minute (RPM), but it is contemplated that any run speed may be used that corresponds with a typical run speed or run speed range of a given engine type. Pressure peaks 602 may vary slightly from cycle to cycle, so it is contemplated that an average peak pressure 606 may be determined based on a plurality of several to many of the pressure peaks 602, using system 512. According to the disclosure, average peak pressure 606 thereby uniquely correlates to a given run speed and fill ratio of fluid 404 within cooling gallery 402. In another example, instead of using pressure peaks for the purposes of calibration, it is contemplated that an average of pressure valleys, based off of a plurality of valleys 604 may instead be used to calibrate and determine a fill ratio of coolant or oil.

As still another example, it is contemplated that an average of pressure differential may be used as well, to calibrate and determine that fill ratio of coolant or oil. In this example, a pressure differential may be determined between peaks 602 and valleys 604. In one version, each differential within a given cyclical pressure cycle may be determined for each cycle, and then the average differential may be obtained. However, in another version, an average of a plurality of peak pressures may be obtained from peaks 602, and an average of low or bottom pressures may likewise be obtained from valleys 604, and an average pressure differential may be obtained as a difference between the average of the plurality of peak pressures, and the average of the plurality of low pressures.

As such, calibration measurements may be performed that vary the run speed of the engine for a given fill ratio, and average peak, low, or differential pressure may be measured within cooling gallery 402 as a function of engine run speed. The amount of fluid 404 may be changed between calibration measurements, as well, so that pressure measurements may be made as a function of run speed for other known fill ratios. As such, referring back to FIG. 3, calibration sequence 300 starts at step 302, and at step 304 cooling gallery 402 is filled to a known and controlled fill ratio of oil. At step 306 cooling gallery 402 is sealed and at step 308 piston 400 is operated within engine 502 through a range of run speeds. At step 310, the pressures are measured as a function of run speed, and average peak, low, or differential pressures are obtained at each run speed and for a given or known fill ratio of oil. At step 312, if a different fill ratio is desired 314, then cooling gallery 402 is opened up, filled to another known and controlled fill ratio of oil, and pressure curves are generated as a function of run speed, repeating steps 306, 308, and 310. Accordingly, calibration sequence 300 may be used to generate numerous pressure curves as a function of run speed, and for different fill ratios. At step 316, if no further calibration data is desired, then the calibration sequence 300 ends at step 318.

Figure 7:
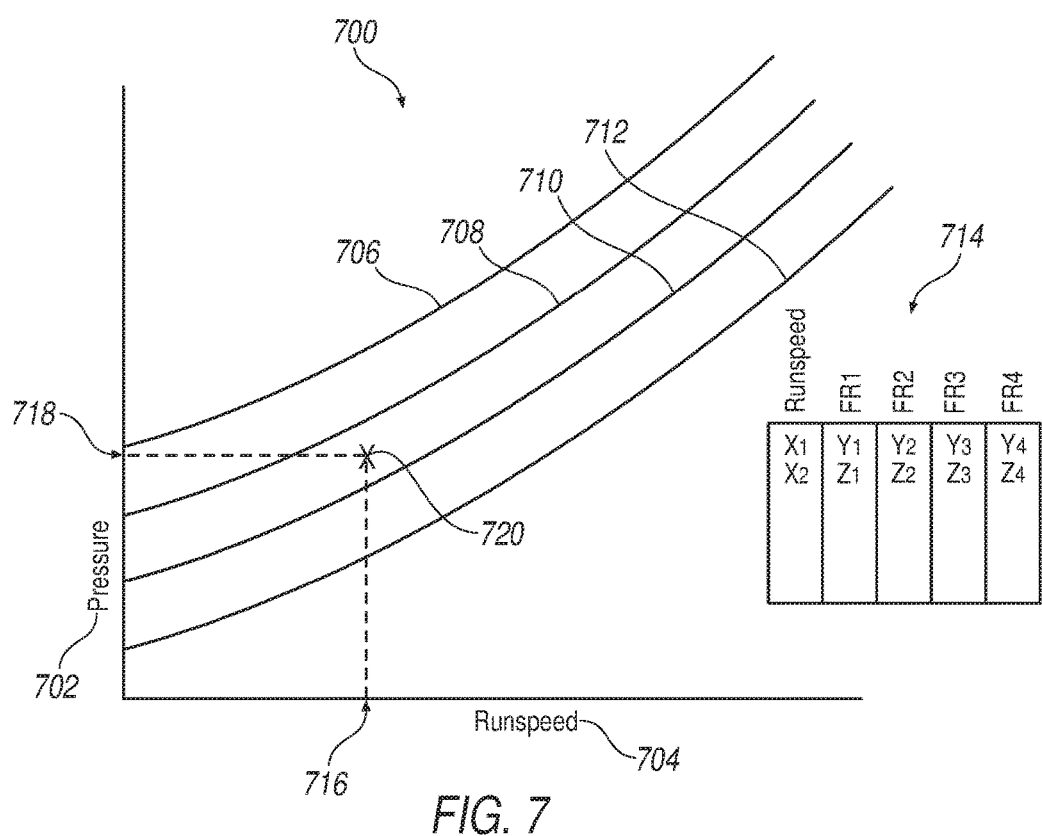
FIG. 7 shows an exemplary graph of curves in which pressure is on the ordinate of graph and run speed is on the abscissa.

FIG. 7 shows an exemplary graph 700 of curves in which pressure 702 is on the ordinate of graph 700, and run speed 704 is on the abscissa. Curves 706, 708, 710, and 712 thereby represent exemplary curves, each corresponding to a unique and fixed fill ratio as described above. In such fashion, an overall design space may be mapped, for any given cooling gallery design (which is likely unique to its particular piston design), such that peak, low, or differential pressures occurring within the cooling chamber indicate a unique fill ratio at a given run speed. Thus, as commonly known, interpolation and other graphing or known mathematical techniques may be used to determine a fill ratio for other fill ratios that may not have been directly measured. In addition, FIG. 7 includes a look-up table 714 that includes, instead of the graphical information plotted against run speed 704 and pressure 702, tabulated data that may likewise be used and mathematically manipulated to determine calibrated pressure responses, as well. Accordingly, and according to the disclosure, pressure 702 may represent any one of the peak, low, or differential pressures that are measured during a calibration step, and then used to determine the fill ratio as disclosed herein.

As such, according to the disclosure, a system 500 includes an engine block 502 having a plurality of cylinders (not visible) positioned therein. Engine block 502 may be a production engine, or may be a prototype engine, and may have fill ratios determined within pistons according to the following steps, as shown in FIG. 4. A disclosed calibration method thereby includes filling a cooling gallery of a piston with a known volume of oil. The cooling gallery is disposed about a circumference of the piston. The method includes sealing the cooling gallery such that the oil cannot escape from the cooling gallery, operating the piston with a cyclical action and at a known cyclical rate that causes pressure fluctuations within the cooling gallery, measuring the pressure fluctuations within the cooling gallery using at least one pressure sensor positioned to detect the pressure fluctuations, determining peak pressures that occur during the pressure fluctuations, and correlating the peak pressures within the cooling gallery with the known volume of oil.

In addition and according to the disclosure, once calibration graph 700 is generated for a given piston and cooling gallery design, then a functioning piston assembly having an open cooling gallery may thereby be used in a 'live' situation to determine its fill ratio during operation. For instance, referring back to FIG. 2, system 200 includes piston 202 that may be placed into an engine or system, such as engine 502 of FIG. 5. However, in this 'live' operation, first aperture 216 and second aperture 222 are open, and oil is caused to be introduced into cooling gallery 214 via oil jet or cooling nozzle 220. Piston 202 may be instrumented with one or more pressure sensors, such as pressure sensors 408, 412 of FIG. 4, such that pressures within cooling gallery 214 may be measured during operation. In this case, again, "operation" refers to functional operation of the cylinders of engine 502 except for piston 202 which is instrumented and operated without combustion in that cylinder. In such fashion, pressures within cooling gallery 214 are measured, and peak, low, or differential pressures determined in the same fashion as above and during calibration sequence 300. Once measured and determined, the peak, low, or differential pressures at a given run speed may then be used to determine, from calibration graph 700, what the fill ratio within the cooling gallery 214 is during operation at the given run speed. In fact, it is contemplated that not only the peak, low, or differential pressures may be used as a basis for determining the fill ratio, but other characteristics Thus, referring back to FIG. 7, an engine that has been calibrated according to the above discussion may now have its fill ratio determined during operation, based on a known run speed 716 and at a measured average peak pressure 718. At an intersection point 720, known mathematical principles may be readily employed to determine a fill ratio that occurs (between fill ratios represented by curve 708 and curve 710, in the example shown) Likewise, look-up table 714 may be employed, as well, to determine a fill ratio "FR" that occurs at the given set of conditions. Further, it is contemplated that each of curves 706-712 may have curve fit routines applied thereto, such that additional manipulation is available to convert measured pressures at known run speeds to a fill fraction, based on the average peak pressure measurements.

Accordingly, a processor having a program communicatively coupled to the processor is configured to detect cyclical pressure fluctuations within the cooling gallery, via the at least one pressure sensor, during the operation of the engine, determine peak pressures that occur during the detected cyclical pressure fluctuations, and determine a fill ratio of oil within the cooling gallery cyclical pressure fluctuations. The processor is configured to determine an average peak pressure that occurs based on the peak pressures during the detected cyclical pressure fluctuations. The processor is configured to determine the fill ratio as an average fill ratio based on the average peak pressure. The processor is further configured to determine a speed of the engine, and determine the fill ratio of oil within the cooling gallery at the determined speed of the engine based on the determined peak pressures. The processor is also configured to access a lookup table that correlates between the speed of the engine and the fill ratio, and determine the fill ratio based on the correlation. The processor is also configured to access a curve-fit equation that correlates between the speed of the engine and the fill ratio, and determine the fill ratio based on the correlation. At least one pressure sensor is positioned within the piston includes six or more pressure sensors distributed at sensor locations about a circumference of the piston to detect the pressure fluctuations within the cooling gallery at the sensor locations.

Also disclosed is a method that includes measuring cyclical pressure fluctuations within a cooling gallery of a piston with at least one pressure sensor that is positioned within the piston, to detect pressure fluctuations within the cooling gallery during an operation of the engine, determining peak pressures that occur during the cyclical pressure fluctuations, and determining a fill ratio of oil within the cooling gallery based on the peak pressures.

Further, pressure sensors 408, 412 may include any wired or wireless sensor, for example. Sensors 408, 412 may be communicatively connected to or part of device 514. The sensors 408, 412, using transceiver 528, may be configured to communicate a pressure (e.g., real-time, near real-time, periodically, or upon request of the user) to any or all of user interface 526 and server 516.

System 500 may include an overall network infrastructure through which the device 514, sensors 408, 412, server 516, and database 534 may communicate, for example, to pressure information. In general, a network (e.g., system 512 or network 532) may be a collection of computing devices and other hardware to provide connections and carry communications.

The device 514 may include any computing device such as include a mobile device, cellular phone, smartphone, smartwatch, activity tracker, tablet computer, next generation portable device, handheld computer, notebook, or laptop. Device 514 may include processor 518 that executes program 522. Device 514 may include memory 520 that stores body performance information and program 522. The device 514 may include transceiver 528 that communicates body performance information between any of device 514, sensor 408, 412, server 516, and database 534.

The user interface 526 of device 512 may include any display or mechanism to connect to a display. Examples of a display may include, without limitation, a touchscreen, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, and the like.

The connections 530 may be any wired or wireless connections between two or more endpoints (e.g., devices or systems). Connection 530 may include a local area network, for example, to communicatively connect the device 514 with network 532. Connection 530 may include a wide area network connection, for example, to communicatively connect server 516 with network 532. Connection 530 may include a radiofrequency (RF), near field communication (NFC), Bluetooth®, Wi-Fi, or a wired connection, for example, to communicatively connect the device 514 and sensors 408, 412.

Any portion of system 512, may include a computing system and/or device that includes a processor 518 and a memory 520. Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, SQL, PL/SQL, Shell Scripts, etc. The system 512, e.g., device 514 and server 516 may take many different forms and include multiple and/or alternate components and facilities, as illustrated in the Figures further described below. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the Black-Berry OS distributed by Research In Motion of Waterloo, Canada, and the Android operating system developed by the Open Handset Alliance. Examples of computing systems and/or devices such as device 102 and servers 104a-d may include, without limitation, mobile devices, cellular phones, smart-phones, super-phones, tablet computers, next generation portable devices, mobile printers, handheld computers, notebooks, laptops, secure voice communication equipment, networking hardware, computer workstations, or any other computing system and/or device.

Further, processors such as processor 518 receive instructions from memories such as memory 520 or database 534 and execute the instructions, thereby performing one or more processes, including one or more of the processes described herein. Such instructions may be stored and transmitted using a variety of computer-readable mediums (e.g., memory 520 or database 534). Processors such as processor 518 may include any computer hardware or combination of computer hardware that is configured to accomplish the purpose of the devices, systems, and processes described herein. For example, the processor 518 may be any one of, but not limited to single, dual, triple, or quad core processors (on one single chip), graphics processing units, visual processing units, and virtual processors.

Memories such as memory 520 or database 534 may include, in general, any computer-readable medium (also referred to as a processor-readable medium) that may include any non-transitory (e.g., tangible) medium that participates in providing body performance information or instructions that may be read by a computer (e.g., by the processors 518 of the device 514 and server 516). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Further, databases, and data repositories described herein may generally include various kinds of mechanisms for storing, providing, accessing, and retrieving various kinds of body performance information, including a hierarchical database, a set of files in a file system, an application database in a proprietary format, a relational database management system (RDBMS), etc. Each such body performance information store may generally be included within or external to a computing system and/or device employing a computer operating system such as one of those mentioned above, and/or accessed via a network or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. It is anticipated and intended that future developments will occur in the arts discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising: an engine block having a plurality of cylinder-piston combinations, wherein at least one of the cylinder-piston combinations includes: a cylinder; a piston positioned in the cylinder and coupled to a connecting rod, the piston having an internal cooling gallery about a circumference of the piston; an oil jet for introducing coolant into the cooling gallery; and at least one pressure sensor positioned within the piston to detect pressure fluctuations within the cooling gallery; and a processor having a program communicatively coupled to the processor, the processor configured to: detect cyclical pressure fluctuations within the cooling gallery, via the at least one pressure sensor, during a linear motion of the piston within the engine block; determine pressures that occur during the detected cyclical pressure fluctuations; and determine a fill ratio of coolant within the cooling gallery based on the determined pressures, wherein the fill ratio is defined by a fraction of a volume of the coolant in the cooling gallery to a total volume of the cooling gallery.

2. The system of claim 1, wherein the processor is configured to determine the pressures as one of an average peak pressure, an average low pressure, and an average pressure differential that occurs based on the detected cyclical pressure fluctuations, and wherein the processor is configured to determine the fill ratio based off of the one of the average peak pressure, the average low pressure, and the average pressure differential.

3. The system of claim 1, further comprising a test arm attached to the engine block, the test arm having an end effector that is mechanically coupled to the piston, the test arm having a first extension and a second extension, and at least one hinge coupled to one of the first extension and the second extension to allow rotational motion about the at least one hinge during the linear motion of the piston within the cylinder block.

4. The system of claim 1, wherein the processor is configured to:
determine a speed of the engine; and
determine the fill ratio of coolant within the cooling gallery at the determined speed of the engine based on the determined peak pressures.

5. The system of claim 4, wherein the processor is configured to:
access a lookup table that correlates between the determined pressures within the cooling gallery and the speed of the engine and the fill ratio to determine the fill ratio based on the determined pressures.

6. The system of claim 4, wherein the processor is configured to:
access a curve-fit equation that correlates between the determined pressures within the cooling gallery and the speed of the engine and the fill ratio to determine the fill ratio based on the determined pressures.

7. The system of claim 1, wherein the at least one pressure sensor positioned within the piston includes six or more pressure sensors distributed at sensor locations about a circumference of the piston to detect the pressure fluctuations within the cooling gallery at the sensor locations.

8. A method, comprising: measuring cyclical pressure fluctuations within a cooling gallery of a piston with at least one pressure sensor that is positioned within the piston, to detect pressure fluctuations within the cooling gallery, wherein the piston is within an engine block having a plurality of cylinder-piston combinations; determining one of a peak pressure, a low pressure, and a pressure differential that occurs during the cyclical pressure fluctuations; and determining a fill ratio of coolant within the cooling gallery based on the determined peak, low, or differential pressures; wherein the fill ratio is defined by a fraction of a volume of the coolant in the cooling gallery to a total volume of the cooling gallery.

9. The method of claim 8, comprising determining the one of the peak pressure, the low pressure, and the pressure differential that occurs based on the pressures that occur during the cyclical pressure fluctuations.

10. The method of claim 9, comprising determining the fill ratio as an average fill ratio based on the one of the peak pressure, the low pressure, and the differential pressure.

11. The method of claim 8, comprising:
determining a speed of piston movement; and
determining the fill ratio of coolant within the cooling gallery at the determined piston speed based on the peak pressures.

12. The method of claim 11, comprising:
accessing a lookup table that correlates between at least one of the peak pressure, the low pressure, and the pressure differential within the cooling gallery and the piston speed and the fill ratio; and
the step of determining the fill ratio includes determining based on at least one of the determined peak pressure, the low pressure, and the pressure differential within the cooling gallery.

13. The method of claim 11, comprising:
accessing a curve-fit equation that correlates between at least one of the peak pressure, the low pressure, and the pressure differential within the cooling gallery and the piston speed and the fill ratio; and
the step of determining the fill ratio includes determining based on at least one of the determined peak pressure, the low pressure, and the pressure differential within the cooling gallery.

14. The method of claim 8, wherein the at least one pressure sensor positioned within the piston includes six or more pressure sensors distributed at sensor locations about a circumference of the piston to detect the pressure fluctuations within the cooling gallery at the sensor locations.

* * * * *